US006574289B1

(12) United States Patent
Tran et al.

(10) Patent No.: US 6,574,289 B1
(45) Date of Patent: Jun. 3, 2003

(54) METHOD FOR DETERMINING FRAME RATE OF A DATA FRAME IN A COMMUNICATION SYSTEM BY USING APRIORI KNOWLEDGE OF DATA FRAME

(75) Inventors: Hau (Howard) Thien Tran, Downey, CA (US); Jyoti Setlur, Irvine, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/427,502

(22) Filed: Oct. 26, 1999

(51) Int. Cl.[7] .................................................. H04L 7/00
(52) U.S. Cl. ........................ 375/341; 375/225; 375/228; 375/262; 375/287; 375/368
(58) Field of Search .................................. 375/341, 365, 375/368, 354, 262, 287, 224, 225, 228

(56) References Cited

U.S. PATENT DOCUMENTS

| 5,796,757 A | * | 8/1998 | Czaja | 714/789 |
| 5,883,923 A | * | 3/1999 | Shimazaki | 375/225 |
| 5,978,428 A | * | 11/1999 | Hayashi | 375/316 |
| 6,108,372 A | * | 8/2000 | Tidemann et al. | 375/225 |

FOREIGN PATENT DOCUMENTS

EP        817440 A2    1/1998    ........... H04L/25/02

OTHER PUBLICATIONS

Okumura Y Et Al: "Variable–Rate Data Transmission with Blind Rate Detection for Coherent DS–CDMA Mobile Radio" IEICE Transactions on Communications JP, Institute of Electronics Information and Comm. Eng. Tokyo, vol. E81–B, No. 7, Jul. 1, 1998, pp. 1365–1372, XP000790169 ISSN: 0916–8516 abstract p. 1367, paragraph 3—p. 1368, paragraph 1.

Czaja S Et Al: "Variable Date Rate Viterbi Decoder with Modified Lova Algorithm" IEEE Region Ten International Conference on Microelectronics and VLSI. (Tencon), US, New York, IEEE, Nov. 6, 1995, pp. 472–475, XP000585825 ISBN: 0–7803–2625–3 p. 472, paragraph 3; p. 473, paragraph 1—paragraph 2; p. 474, paragraph 3.

* cited by examiner

Primary Examiner—Chi Pham
Assistant Examiner—Pankaj Kumar
(74) Attorney, Agent, or Firm—Peter Zawilski

(57) ABSTRACT

A method of determining a frame rate of a data frame in a communication system by using apriori knowledge of data frame. In one embodiment, a signal is received at the communication device. Then a data frame portion of the signal is isolated. Next, a potential frame rate is chosen and the data frame is formatted accordingly. Decoding, at the chosen potential frame rate, occurs on the data frame. Then, a tail bit portion of the data frame is isolated. Afterward, a logic level of the decoded tail bit data is compared against the apriori knowledge of a transmitted logic level for the tail bit portion of the data frame. In addition, comparisons are also made between other data metrics and their expected values. Finally, a level of confidence is communicated to the communication device based upon a result of the comparisons.

44 Claims, 8 Drawing Sheets

| 500a | UNENCODED DATA (INPUT TO RATE 1/2, K=9 CONV ENCODER) | | | | | | | | |
|---|---|---|---|---|---|---|---|---|---|
| DATA - - - | | B1 | B2 | B3 | B4 | B5 | B6 | B7 | B8 |

| 500b | CONVOLUTIONAL ENCODER OUTPUT | | | | | | | | | |
|---|---|---|---|---|---|---|---|---|---|---|
| DATA - - - | $C_{11}$ | $C_{12}$ | ... | $C_{51}$ | $C_{52}$ | $C_{61}$ | $C_{62}$ | $C_{71}$ | $C_{72}$ | $C_{81}$ | $C_{82}$ |

| 500c | FULL-RATE TRANSMITTED DATA | | | | |
|---|---|---|---|---|---|
| DATA - - - | - - - | - - - - - | $\dfrac{T_{71}}{C_{71}}$ | $\dfrac{T_{72}}{C_{72}}$ | $\dfrac{T_{81}}{C_{81}}$ | $\dfrac{T_{82}}{C_{82}}$ |

| 500d | RECEIVED DATA - FORMATTED AT FULL RATE | | | | |
|---|---|---|---|---|---|
| DATA - - - | - - - | - - - - - | $\dfrac{F_{71}}{T_{71}}$ | $\dfrac{F_{72}}{T_{72}}$ | $\dfrac{F_{81}}{T_{81}}$ | $\dfrac{F_{82}}{T_{82}}$ |

| 500e | RECEIVED DATA - FORMATTED AT HALF RATE | | |
|---|---|---|---|
| DATA - - - | - - - | - - - - - | $\dfrac{H_{81}}{(T_{71}+T_{72})}$ | $\dfrac{H_{82}}{(T_{81}+T_{82})}$ |

FIGURE 5

METHOD FOR DETERMINING FRAME RATE OF A DATA FRAME IN A COMMUNICATION SYSTEM BY USING APRIORI KNOWLEDGE OF DATA FRAME

TECHNICAL FIELD

The present claimed invention relates to the field of digital communication. Specifically, the present claimed invention relates to an apparatus and a method for determining frame rate of a data frame in a communication system by using apriori knowledge of the data in a frame.

BACKGROUND ART

Wireless telephony, e.g. cellular phone use, is a widely-used mode of communication today. Variable rate communication systems, such as Code Division Multiple Access (CDMA) spread spectrum systems, are among the most commonly deployed wireless technology. Because of increasing demand and limited resources, a need arises to improve their fidelity and performance.

Referring to prior art FIG. 1A, a conventional base station 104, e.g. cell, and a mobile unit 102, e.g. a cell phone, are shown. A CDMA system uses a common bandwidth to transmit the pilot signal and a data signal 106 between a base station 104 and a mobile unit 102, for multiple users. Hence, the bandwidth is occupied by an combination of many signals. Variable rate communication systems transmit data in units called data frames, and, as its name indicates, at various frame rates.

In the case of CDMA systems, frame rate information is not transmitted from one unit to the other, e.g. from the originating base station to the receiver. Thus, the receiver needs to determine the frame rate of any and all data frames received from the transmitter on a frame-by-frame basis. That is, each successive data frame can have a different frame rate, depending upon which frame rate is most efficient given the amount of data in the signal at that time. As such, the receiver needs to have a method for determining the frame rate at which a given data frame is being transmitted, when the data frame is received at the unit.

Conventional methods used to determine the frame rate of a data frame exist. However, these conventional methods utilize a characteristic, or property, of the signal to attempt to identify the true frame rate of the data frame. For example, one prior art method evaluates the intensity of the signal. More specifically, a full-rate transmission of a data frame will have a higher intensity level because it packs a higher quantity of bits in the data frame, while an eighth-rate transmission of a data frame will have a lower intensity level, because it packs a lower quantity of bits in the data frame. As mentioned, because the frame rate of a data frame is not directly indicated by the transmitter, any conventional method of determining the frame rate can only provide a level of confidence that the guessed frame rate is the true frame rate of the data frame. Under different circumstances, each conventional method of determining frame rates may have weaknesses and strengths. If additional methods, using different strategies, for determining frame rates are available, a more reliable level of confidence of the frame rate can be established. Hence a need arises for additional methods, and novel strategies, for determining the frame rate of a data frame.

Additionally, a method and device for determining the frame rate of a data frame in a high noise level, variable rate communication system must not require significant revamping of the existing communication system. That is, in implementing a viable method and device for frame rate determination in a variable rate communication system, components that are well known in the art, and are compatible with existing communication systems, are necessary if cost and reliability are to be optimized. In so doing, the need to incur costly expenditures for retrofitting existing communication systems or for building custom components is avoided. However, if modification is required for implementing some methods of determining a frame rate of a data frame, a need arises to keep these modifications to a minimum.

In summary, a need exists for a method and device for improving the fidelity and performance of a CDMA communication system. In particular, a need arises for frame rate determination in a variable rate communication system. More specifically, a need arises for additional methods, that use new strategies, for determining the frame rate. Still another need exists for a method and system which meets both of the above cited needs and wherein the method and device is easy to implement and is conducive to use with existing variable rate communication systems. Lastly, if modification is required for implementing some methods of determining a frame rate of a data frame, a need arises to keep these modifications to a minimum.

DISCLOSURE OF THE INVENTION

The present invention provides a method and apparatus for improving the fidelity and performance of digital communication. In particular, the present invention provides a method and apparatus for determining the frame rate of a data frame in a variable rate communication system. More specifically, the present invention determines the frame rate using new methods, or algorithms. Additionally, the method and apparatus of the present invention is easy to implement and is conducive to use with existing variable rate communication systems. Lastly, the present invention provides some methods of determining a frame rate of a data frame that require only minor modifications to the communication device hardware.

Specifically, the present invention utilizes apriori knowledge of a logic level for a portion of a data frame to determine the frame rate of the data frame. One embodiment utilizes the fact that, for convolutionally encoded data that uses tail bits, each data frame uses a tail bit portion to reset the shift registers used for encoding the data frame. The tail bit portion of the data frame is established as having eight bits with a low logic level, e.g. "0," for the case of constraint length K=9, for a convolutional encoder, though other constraint lengths are possible. However, with different frame rates in a variable rate communication system, the last eight bits span different amounts of time. This provides a useful discriminator between the different possible frame rates as applied to an actual data frame. This information generates, in one embodiment, a method to enhance the level of reliability in determining a frame rate for a data frame. In particular, if a correlation result between a received data signal and its apriori-established transmitted data signal exceeds a threshold value, then a good level of confidence can be established that the assumed frame rate is probably correct.

In one embodiment, the apriori knowledge that the tail bits have a logic zero level can be used to evaluate the frame rate in a different manner. In this embodiment, performance of the Viterbi decoder is used to determine the frame rate of the data frame. Specifically, if the chosen frame rate implemented by a Viterbi decoder yields a state change, in an apriori-established direction or sequence, for the last eight bits of the data frame, for at least one possible path in the trellis diagram evaluation, then a good level of confidence exists that the frame rate implemented is the true frame rate of the data frame. In addition, a branch metric is calculated for an expected input of 0 and an expected input of 1 for every state. The "expected 0" branch metrics are summed together for all states of a given time stage in the tail-bit portion of the trellis diagram. Similarly, the "expected 1" branch metrics are also summed together for all states of a given time stage. A delta is then calculated from the difference between the summed expected 1 branch metric and the summed expected 0 branch metric for each given time stage. Next, the deltas for all time stages in the tail bit portion are summed to obtain a deltasum. If the deltasum is a large positive value, then a good level of confidence exists that the frame rate utilized by the Viterbi decoder is the correct one. If the deltasum is a smaller number, then a lower level of confidence exists that the frame rate utilized by the Viterbi decoder is the correct one. The branch metric deltas for the tail bits, provided by the symbol detector portion of the Viterbi decoder, provide a soft decision about the frame rate. In the present embodiment, a lower metric, and hence a larger deltasum, is established as representing a higher level of confidence. However, the present invention is well-suited to an alternative embodiment where a higher metric, and hence a smaller deltasum, is established as representing a higher level of confidence.

In another embodiment, the normal "hard decision" decoded tail bit outputs of the Viterbi Decoder are used along with "soft decisions" that arise from the branch metric deltas for the tail bits described in the previous embodiment. The hard decision decoded tail bit outputs are provided by a traceback operation implemented by the sequence detector portion of the Viterbi decoder. Hence, the present embodiment utilizes both the traceback operation and the symbol detector portion of the Viterbi decoder. Consequently, a more reliable soft output is obtained, thereby enhancing the reliability of the frame rate determination process.

Specifically, the second embodiment computes and stores the eight soft decisions, e.g. the branch metric deltas, for each of the eight tail bit time stages, e.g. delta(1) through delta(8), as referred to in the previous embodiment. In addition, the normal decoding operation also occurs. Once the eight hard decisions are completed, the eight soft symbols are computed by combining the hard decisions with the soft decisions. Next, each of the eight soft symbols are correlated to the expected tail bits to obtain a correlation result. The correlation result essentially provides an indication of whether the received bit was a 0, as expected for the tail bit, and provides a level of confidence for the indication. For each frame rate, a correlation result is determined and compared with a respective threshold value for each frame rate. A favorable comparison indicates that the chosen frame rate is the correct one.

One embodiment of the present invention provides an algorithm for determining the frame rate of a data portion of a data frame with no hardware changes to the communication device. In another embodiment, minor hardware changes to the communication device are required for a different algorithm for determining the frame rate of a data portion of a data frame.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART

FIG. 5 is a chart of several exemplary data frames at different stages of transmission and reception, in accordance with one embodiment of the present invention.

BEST MODE FOR CARRYING OUT THE INVENTION

Figure 1A:
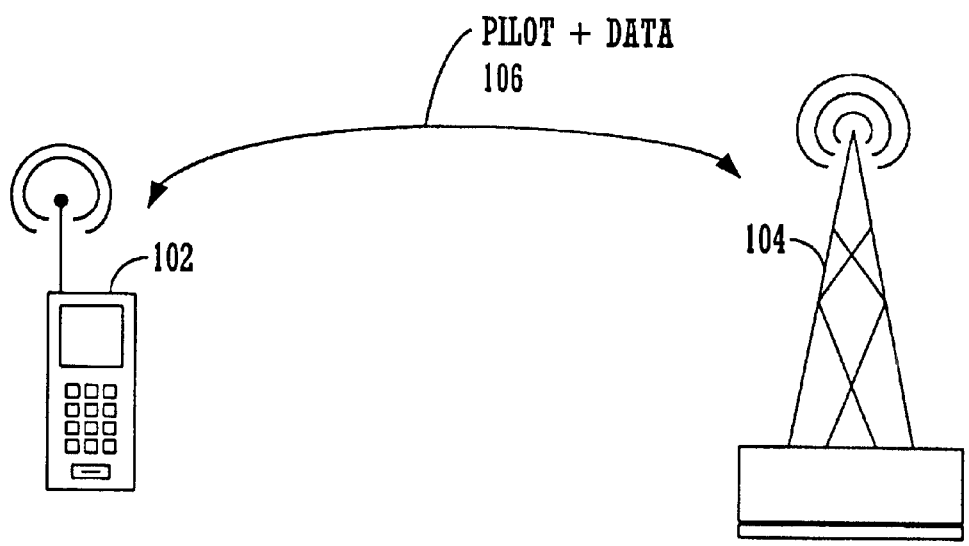
FIG. 1A is an illustration of a conventional base station and cell phone.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result.

The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "selecting," "choosing," "sampling," "comparing," "indicating," "repeating," "ecoding," "determining," "providing," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

Figure 2A:
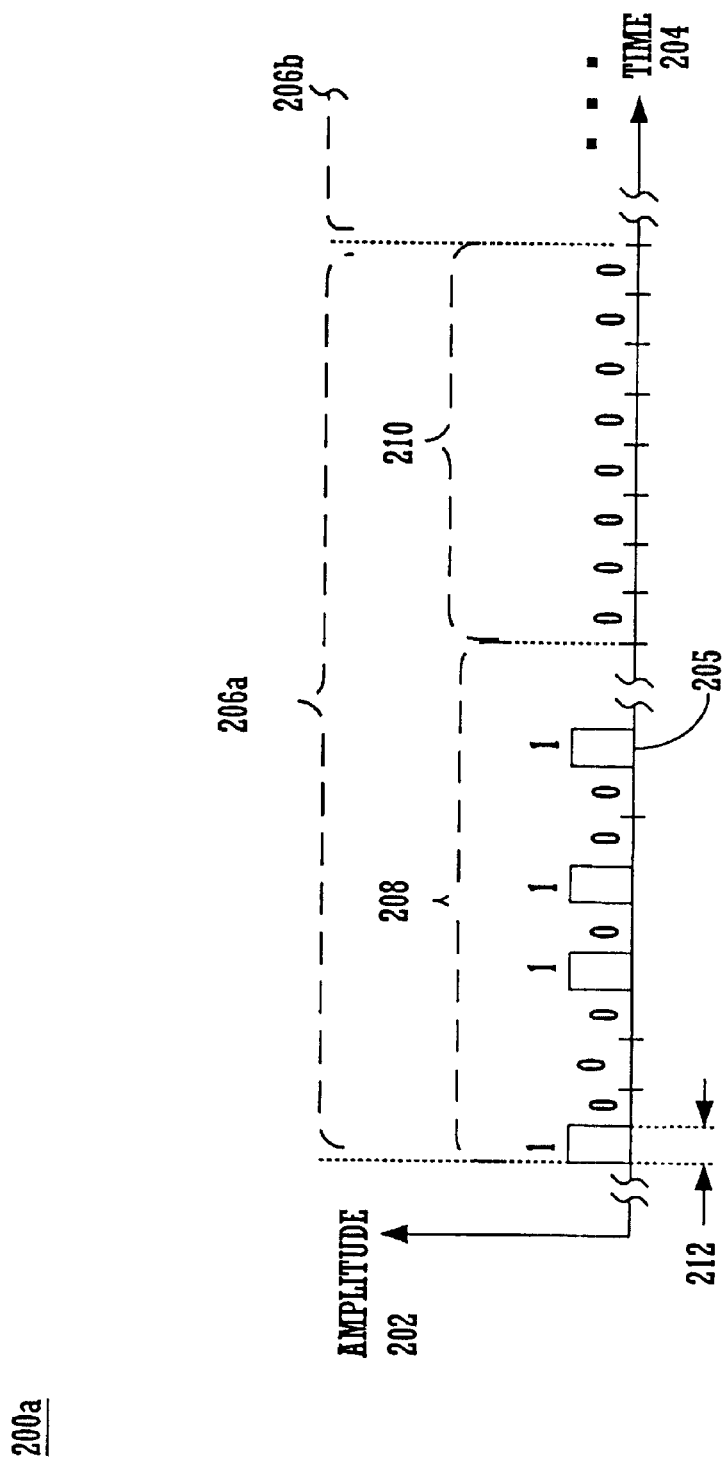
FIG. 2A is a time trace of a hypothetical data frame used in a communication system, in accordance with one embodiment of the present invention.

Referring now to FIG. 2A, a hypothetical data frame used in a communication system is shown, in accordance with one embodiment of the present invention. FIG. 2A shows an abscissa of time 204, over which bits of information may be separated, and an ordinate of amplitude 202, for representing logic levels, e.g. high and low, of data. In general, transmitted and received signals in a digital communication system are segregated into data frames, comprised of a specific length of binary digits, or bits. For example, FIG. 2A shows an exemplary data frame 206a, which is followed by subsequent data frames, e.g. 206b. Data frame 206a in the present embodiment includes a data portion 208, which can include system information as a header, and a tail bit portion 210. The data frame shown in FIG. 2A is the unencoded data bit configuration of the frame. It is appreciated that the data frame shown can also exist in an encoded symbol domain, for transmission. Noteworthy is the fact that the tail bits of the unencoded data all have a low logic level, e.g. "0." While the present embodiment utilizes low logic levels for tail bits, the present invention is well-suited to other logic levels, e.g. "1," assuming the level is inverted as appropriate for coding and decoding operations. The data portion 208 of the data frame 206a typically includes low logic levels and high logic levels that represent data values. In lieu of using "+1" and "0" for logic levels, the present invention is well-suited to using logic levels of "+1" and "−1" for transmitting data signals and tail bit signals. In this latter embodiment, the test conditions would appropriately change for the new logic levels.

Figure 2B:
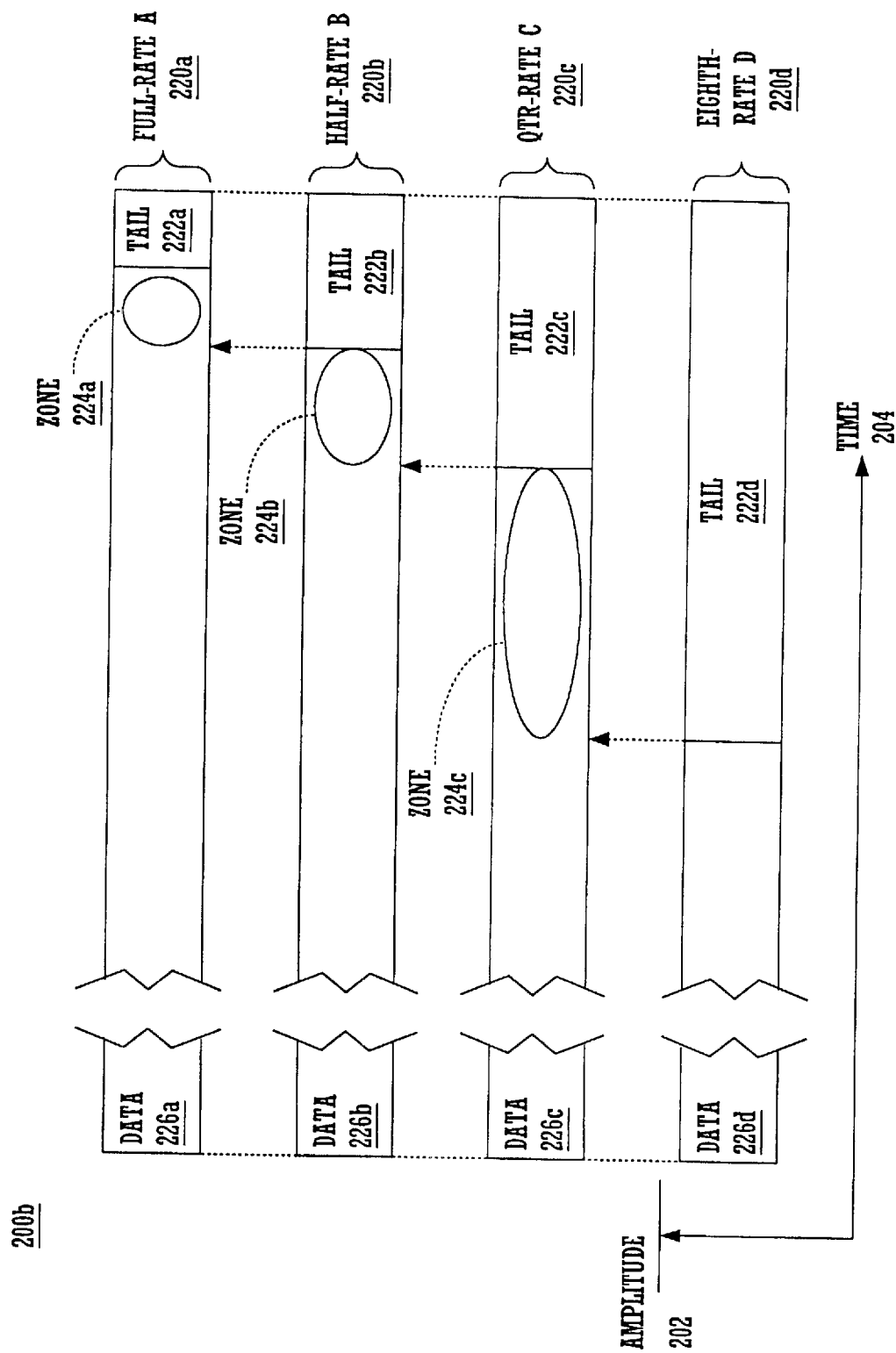
FIG. 2B is a block diagram of data frame compositions at different frame rates, in accordance with one embodiment of the present invention.

Referring now to FIG. 2B, a block diagram of a composition of data frames at different frame rates is shown, in accordance with one embodiment of the present invention. The data frames are shown together in FIG. 2B only to allow simultaneous comparison. Similar to the previous figure, present FIG. 2B shows an abscissa of time 204, over which bits of information are separated, and an ordinate of amplitude 202, for representing logic levels of data. However, for clarity, the amplitude of individual data bits for each data frame in FIG. 2B is not shown. Ordinate of FIG. 2B shows a first data frame 226a that has a full-rate frame rate "A" 220a, a second data frame 226b that has a half-rate frame rate "B" 220b, a third data frame 226c that has a quarter-rate frame rate "C" 220c, and a fourth data frame 226d that has an eighth-rate frame rate "D" 220d. While the present embodiment shows four different frame rates, the present invention is well-suited to having any quantity and any value of frame rates. In the present embodiment, the four frame rates provided actually correspond to frame rates used in Code Division Multiple Access (CDMA) variable rate system. In one embodiment, a full-rate can be defined as 400 bits/20 millisecond (msec) for rate A, a half-rate can be defined as 200 bits/20 msec for rate B, a quarter-rate can be defined as 100 bits/20 msec, and an eighth-rate can be defined as 50 bits/20 msec. Again, while the present embodiment shows four specific frame rates, the present invention is well-suited to having any value for the frame rates. For example, the present invention is well-suited to using the actual CDMA data rates.

Still referring to FIG. 2B, the differences in the frame rates for each data frame are manifested in the length of the tail bit portions of each data frame. The difference in the time length, shown on time scale 204, of the tail bits, e.g. 222a–222d, arises because, regardless of the frame rate, the length of the tail bit always consumes the last eight bits of the data frame, for a constraint length K=9 convolutional code. Thus, for example, at full-rate, the last eight bits, e.g. tail 222a, consume 0.4 msec, e.g. 8 bits×(20 msec/400 bits). Similarly, at half-rate, the last eight bits, e.g. tail 222b, consume 0.8 msec. At quarter-rate, the last eight bits, e.g. tail 222c, consume 1.6 msec, and at eighth-rate, the last eight bits, e.g. tail 222d, consume 3.2 msec. This phenomenon is applicable to any rate, besides those used in the present embodiment. Furthermore, the present embodiment uses tail bits having a low logic level, e.g. "0," although an alternative logic level may be used.

Figure 2C:
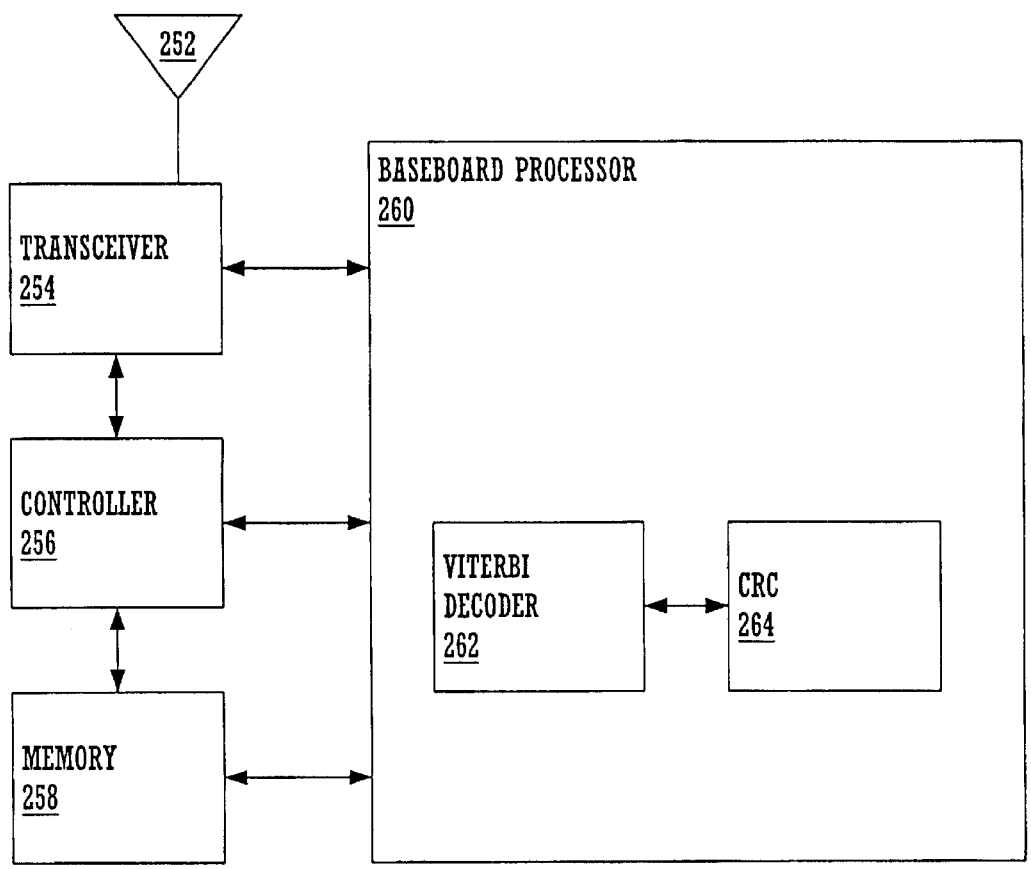
FIG. 2C is a block diagram of a communication device that provides frame rate determination of data frame, in accordance with one embodiment of the present invention.

Referring now to FIG. 2C, a block diagram of a communication device that provides frame rate determination of data frame is shown, in accordance with one embodiment of the present invention. Communication device 200c includes an antennae 252, a transceiver 254, a controller 256, memory 258, and a baseband processor 260. However, the present invention can include many more components than those shown in the present embodiment. Antennae 252 is coupled to transceiver 254. In turn, analog transceiver is coupled to baseband processor 260 and to controller 256. Controller is coupled to memory 258 and baseband processor 260. And memory is also coupled to baseband processor 260. Baseband processor includes a c and a Cyclical Redundancy Checker (CRC) 264, coupled to each other. In different embodiments, baseband processor can be either a Digital Signal Processor (DSP), a state machine, or a combination of the two. Besides these components, the present invention is well-suited to including additional components in baseband processor 260.

Figure 2D:
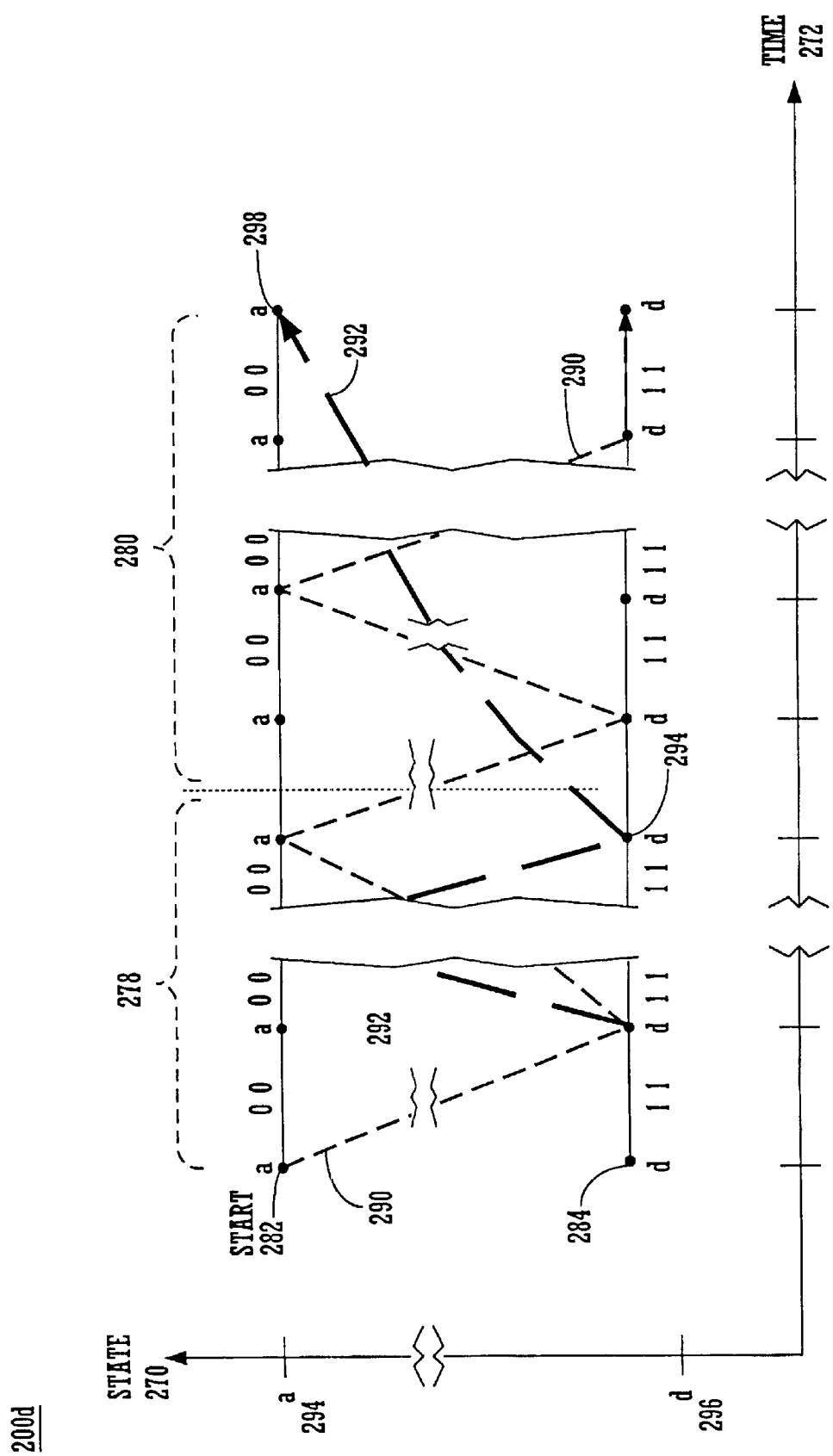
FIG. 2D is an abbreviated trellis diagram used to provide frame rate determination of a data frame, in accordance with one embodiment of the present invention.

Referring now to FIG. 2D, an abbreviated trellis diagram, used to provide frame rate determination of a data frame, is shown, in accordance with one embodiment of the present invention. Trellis diagram 200d is abbreviated, for clarity, to show only two states, state "a" 294 and state "d" 296. However, many other states can exist therein. Trellis diagram 200d is divided into two parts over time, in this figure. The first part 278 of the trellis diagram 200d represents states, and state changes, for the data portion of the data frame. In contrast, the second part 280 of trellis diagram 200d represents states, and state changes, for the tail bit portion of the data frame. Each row of points represents a possible state of the encoder. Hence, the ordinate 270 of trellis diagram 200*d* can represent states. Similarly, each column of points represents a stage, or a point in time where a new bit of data is received. Hence, the abscissa 272 of trellis diagram 200*d* can represent time, or received data bits. Trellis diagram 200*d* starts at point 282, representing the zero state with all shift registers of the encoder zeroed out at the start of a given data frame.

In the data portion 278 of the trellis diagram 200*d,* data values of high logic level or low logic level can be received. These inputs have the effect of changing states, e.g. represented by multiple possible paths from one state in one column to another state in the next column. States can, and do, change in a random fashion, depending upon the logic value of the data input, in the data portion 278 of trellis diagram 200*d.* However, for the tail bit portion 280 of the trellis diagram 200*d,* states should change only in an expected direction, if the correct rate is chosen for decoding. This conclusion arises because the last eight bits of data in the data frame of the present embodiment, have known preset logic values, e.g. they are all zeros. Hence, the state always moves toward an all-zero state, e.g. point 298, as represented by path 292, in the tail bit portion 280 of trellis diagram 200*d.* Path 290 shows state changes occurring in the tail bit portion 280 of the trellis diagram 200*d.* Hence, path 290 is not a surviving path because it does not meet the expected state changes, e.g. path 290 does not move towards an all-zero state of point 298. In contrast, path 292 does satisfy the expected state changes, e.g. tail bit portion of the data frame does move toward an all-zero state shown by point 298.

In the present embodiment, the movement towards an all-zero state occurs gradually, over all stages, within the tail bit portion 280 of trellis diagram 200*d.* However, in an alternative embodiment, the movement of states for tail bits to an all-zero state can occur within a single stage and remain there until the end of the tail bit section. Alternatively, the movement of states for tail bits to an all-zero state can occur over any number of stages available in the portion of the tail bit portion 280 of trellis diagram 200*d* so long as the state of the last tail bit is at the all-zero state. While the present embodiment expects states in the tail bit portion of the data frame to move to an all-zero state, because of an all zero content of tail bits, the present invention is well-suited to using alternative movements of the states in the tail-bit portion of the data frame to establish the frame rate of the data frame. For example, if the tail tails used a high logic value, e.g. "1," instead of a low logic value, then the expected movement of states for the tail bit portion of the data frame would be towards an all 1 data state.

Figure 3:
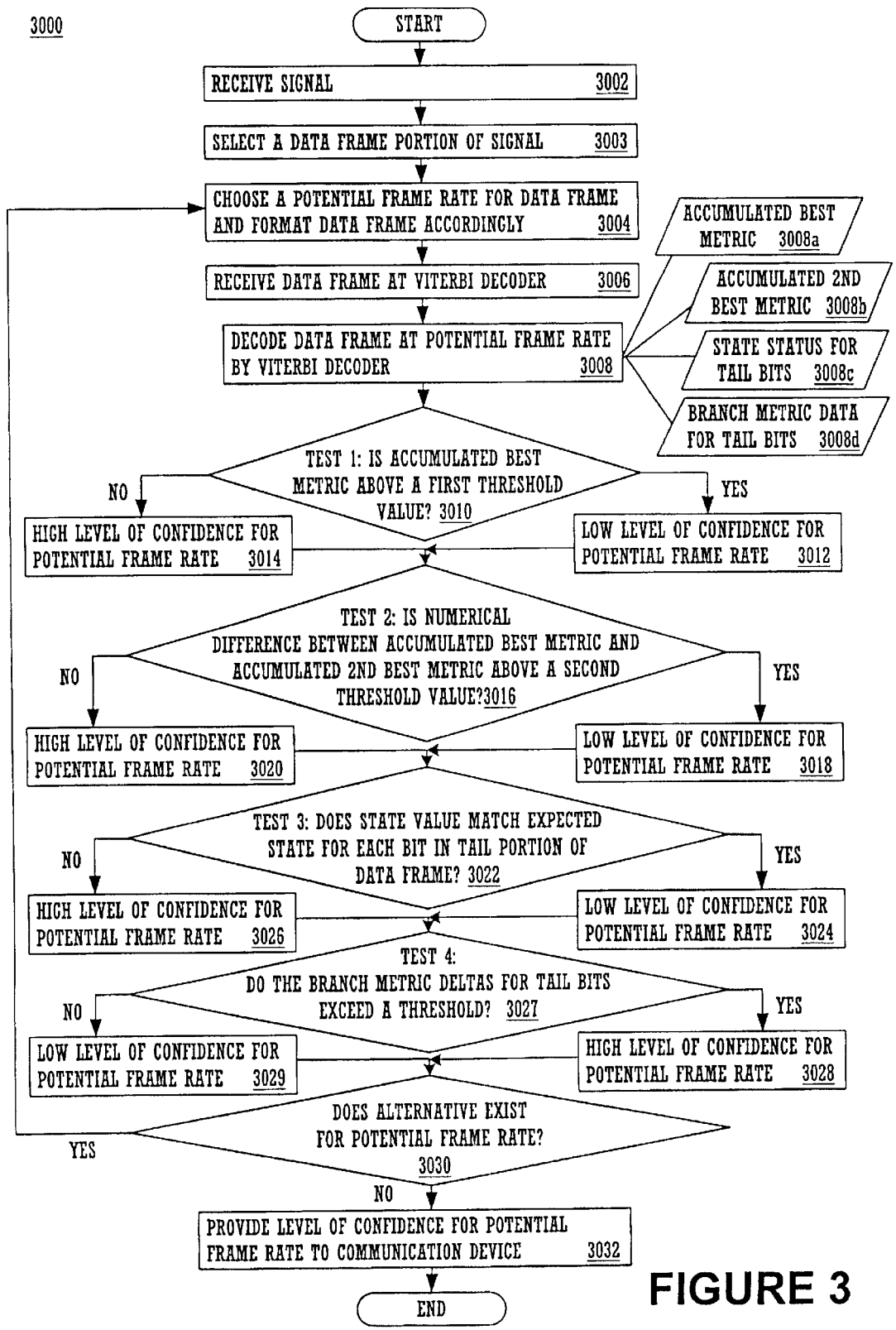
FIG. 3 is a flowchart of the steps used to implement a first embodiment for frame rate determination of a data frame in a communication device, in accordance with one embodiment of the present invention.

Referring now to FIG. 3, a flowchart 3000 of the steps used to implement a first embodiment for frame rate determination of a data frame in a communication device is shown, in accordance with one embodiment of the present invention. By using the flowchart embodiment of the present invention, the frame rate of a data frame may be more accurately determined by using new strategies. Consequently, the present invention provides improved capacity, fidelity, and performance of digital communications. While the present embodiment applies flowchart 3000 to a CDMA digital communication system, the present invention can be applied to any communication system seeking to identify a data rate. Also, the present invention is applicable to both mobile units and base stations used for telecommunications operations.

Flowchart 3000 begins with step 3002. In step 3002 of the present embodiment, a signal is received. In step 3002 of the present embodiment, a signal is received. Step 3002 is implemented, in one embodiment, by the communication device in FIG. 2C. Antennae 252 receives a signal which is processed by transceiver 254 and transmitted to baseband processor 260 for digital signal processing. In one embodiment communication device 200*c* can represent a mobile phone or a base station in a CDMA digital communication system. However, the present invention is well-suited to alternative communication systems. Following step 3002, flowchart 3000 proceeds to step 3003.

In step 3003 of the present embodiment, a data frame portion of the signal is selected. In step 3003 of the present embodiment, a data frame portion of the signal is selected. Step 3003 is implemented, in one embodiment, by the communication device in FIG. 2C. The baseband processor 260 isolates a data frame portion of the signal for subsequent analysis. The data frame portion can be any bit length specified by a given communication system. Following step 3003, flowchart 3000 proceeds to step 3004.

In step 3004 of the present embodiment, a potential frame rate is chosen and formatted. Step 3004 is implemented, in one embodiment, in FIG. 5 where formatting is shown for the different chosen frame rates. Step 3004 arises because the present embodiment utilizes a "variable-rate" communication system. Thus, the rate at which data is communicated between two devices can have any one of many possible rates. There could only be two rates in one embodiment. However, the present invention is well-suited to a communication system having any number of communication rates. Following step 3004, flowchart 3000 proceeds to step 3006.

In step 3006 of the present embodiment, the data frame is received at a Viterbi decoder. Step 3006 is implemented, in one embodiment, by Viterbi decoder 262 shown in FIG. 2C. Following step 3006, flowchart 3000 proceeds to step 3008.

In step 3008 of the present embodiment, a data frame is decoded, by the Viterbi decoder, at the chosen potential frame rate. Step 3008 is implemented, in one embodiment, by the communication device 200*c* in FIG. 2C. Specifically, Viterbi decoder 262 of communication device 200*c* is adapted to decode a data frame. It is appreciated that the construction and operation of Viterbi decoder 262 is well-known in the art. It is appreciated that a Viterbi decoder could provide certain outputs in addition to the data resulting from the decoding operation. These outputs could include, but are not limited to, an accumulated best metric output 3008*a,* which is a sum of the best metrics for each stage in the trellis diagram implemented by the Viterbi decoder. The outputs can also include an accumulated second best metric output 3008*b,* which is a sum of the second best metric for each stage. The accumulated best metric output 3008*a* and accumulated second best metric 3008*b* can be evaluated for only the tail bit portion, e.g. portion 280 of FIG. 2D, of the trellis diagram 200*d,* or for the data portion 278 and the tail bit portion 280. A state status output 3008*c* is available for each of the tail bits. Finally, a branch metric delta output for tail bits 3008*d* is also available. These outputs will be utilized in subsequent steps of flowchart 3000. Following step 3008, flowchart 3000 proceeds to step 3010.

In step 3010 of the present embodiment, an inquiry determines whether the accumulated best metric is above a first threshold. The first threshold value can vary widely, depending upon the characteristics of the communication system to which it is applied, and upon simulation test results. Step 3010 is implemented, in one embodiment, by the communication device in FIG. 2C. In particular, controller 256 can evaluate output from Viterbi decoder 262 that is stored in memory 258, to satisfy step 3010. If the accumulated best metric is above the first threshold, then flowchart 3000 proceeds to step 3012. However, if the accumulated best metric is not above the first threshold, then flowchart 3000 proceeds to step 3014.

The present embodiment for step 3010 utilizes a threshold value to determine whether the result of the inquiry is acceptable. For example, a sliding scale is used in one embodiment to determine a level of confidence depending upon how close the accumulated best metric is the first threshold. Thus, a very good level of confidence may be established if the accumulated best metric is far below the first threshold. And a very low level of confidence may be established if, for example, the accumulated best metric far surpasses the first threshold. However, the present invention is well-suited to using many different types of evaluation.

Step 3012 arises if the accumulated best metric is above the first threshold, as determined in step 3010. In step 3012 of the present embodiment, a low level of confidence is established for the potential frame chosen. Step 3012 is implemented, in one embodiment, by the communication device in FIG. 2C. In particular, controller 256 can establish a low level of confidence and store it as data in memory 258, to satisfy step 3012. Following step 3012, flowchart 3000 proceeds to step 3016.

Step 3014 arises if the accumulated best metric is not above the first threshold, as determined in step 3010. In step 3014 of the present embodiment, a good level of confidence is established for the potential frame chosen, in response to inquiry of step 4010. Step 3014 is implemented, in one embodiment, by the communication device in FIG. 2C. In particular, controller 256 can establish a good level of confidence and store it as data in memory 258, to satisfy step 3014. Following step 3014, flowchart 3000 proceeds to step 3016.

In step 3016 of the present embodiment, an inquiry determines whether a difference between an accumulated best metric and an accumulated second best metric for a data frame is above a second threshold value. The second threshold value can vary widely, depending upon the characteristics of the communication system to which it is applied, and upon simulation test results. However, the present invention is well-suited to utilizing a threshold value that can vary widely, depending upon the characteristics of the communication system to which it is applied. Step 3016 is implemented, in one embodiment, by the communication device in FIG. 2C. In particular, controller 256 can evaluate output from Viterbi decoder 262 that is stored in memory 258 to satisfy step 3016. If the numerical difference between the accumulated best metric and the accumulated second best metric is above the second threshold, then flowchart 3000 proceeds to step 3018. However, if the numerical difference between the accumulated best metric and the accumulated second best metric is not above the second threshold, then flowchart 3000 proceeds to step 3020.

The present embodiment for step 3016 utilizes a threshold value to determine whether the result of the inquiry is acceptable. For example, a sliding scale is used in one embodiment to determine a level of confidence depending upon how far the numerical difference between accumulated best metric and accumulated second best metric is above a second threshold. Thus, a very good level of confidence may be established if the numerical difference is far below the second threshold. And a very low level of confidence may be established if, for example, the numerical difference far surpasses the second threshold. However, the present invention is well-suited to using many different types of evaluation.

Step 3018 arises if the numerical difference between the accumulated best metric and the accumulated second best metric is above the second threshold, as determined in step 3016. In step 3018 of the present embodiment, a low level of confidence is established for the potential frame chosen. Step 3018 is implemented, in one embodiment, by the communication device in FIG. 2C. In particular, controller 256 can establish a low level of confidence and store it as data in memory 258, to satisfy step 3018. Following step 3018, flowchart 3000 proceeds to step 3022.

Step 3020 arises if the numerical difference between the accumulated best metric and the accumulated second best metric is not above the second threshold, as determined in step 3016. In step 3020 of the present embodiment, a good level of confidence is established for the potential frame chosen, in response to inquiry of step 3016. Step 3020 is implemented, in one embodiment, by the communication device in FIG. 2C. In particular, controller 256 can establish a good level of confidence and store it as data in memory 258, to satisfy step 3020. Following step 3020, flowchart 3000 proceeds to step 3022.

In step 3022 of the present embodiment, an inquiry determines whether the state for each of the bits in a tail bit portion of the data frame in the trellis diagram match an expected state for that bit. FIG. 2D shows how step 3022 is implemented. In particular, given the best metric state, e.g. state d 294 for path 292, at the end of the data portion 278 of the trellis diagram 200d, the present embodiment can determine, via a state table for example, the expected state for the first bit in the tail bit portion 280 of the trellis diagram. The expected state can be determined because the tail bit values have been established, apriori, to be zero, in the present embodiment. The actual state calculated from the data value of the first tail bit is compared to this expected state, and counted if it matches. Similarly, an expected state can be determined for the next bit of the tail bit portion of the trellis diagram, given the expected state for the previous bit and the knowledge that the tail bit value is apriori established to be zero. The count is incremented if the two states match. This process continues for all bits in the tail bit portion of the trellis diagram. In one embodiment, the count is only performed using the best metric state, e.g. for the best single path through the data portion 278 of the trellis diagram.

In another embodiment, however, step 3022 can be performed for all the data paths established for the data portion 278 of the trellis diagram. In essence, the trellis diagram 200d is expected to finish at point 298, an all-zero state. However, depending upon the best metric state at the end of the data portion of the trellis diagram, several changes of states might be in order before arriving at the all-zero state for the last bit in the tail bit sequence. Hence, by checking expected state versus actual state for each bit in the tail bit portion of the trellis diagram, the present embodiment provides an efficient method to judge the level of confidence whether the frame rate used by the Viterbi decoder is the actual frame rate of the data frame.

The present embodiment for step 3022 utilizes a threshold value to determine whether the result of the inquiry is acceptable. For example, a sliding scale is used in one embodiment to determine a level of confidence versus the quantity of matching states, e.g. between the actual and expected states. Thus, a very good level of confidence may be established if states match for all eight bits in the tail bit portion of the data frame in one case. And a very low level of confidence may be established if, for example, only one to three states match. However, the present invention is well-suited to using many different types of evaluation.

In one embodiment implementing step 3022, the tail bit portion of the data frame includes the last eight bits, for a constraint length K=9 convolutional code. However, the present invention is well-suited to utilizing other bit lengths, and other portions of the data frame, depending upon the characteristics of the communication system to which it is applied. Step 3022 is implemented, in one embodiment, by the communication device in FIG. 2C. In particular, controller 256 can evaluate output from Viterbi decoder 262 that can be stored in memory 258, to satisfy step 3022.

Step 3022 is further illustrated in FIG. 2A. In FIG. 2A, the tail bit portion 210 of data frame 206a is all zeros. From this apriori knowledge, the state diagram for the tail bit portion of the data frame is expected to change in a specific manner, starting with best metric state from which it starts. Consequently, the trellis diagram of FIG. 2D should have transitions that ultimately approach an all-zero state. This conclusion arises assuming a tail bit logic level of zero, and assuming the Viterbi decoder used the correct frame rate for decoding. Hence, for the present example and embodiment, at least one of the decoded paths has the desired state change, e.g. toward an all-zero state, for the tail bit portion of the signal, then there is a good level of confidence that the frame rate chosen for decoding by the Viterbi decoder is the actual frame rate of the data frame. If the states for each of the bits do not acceptably match the expected state, e.g. count does not exceed threshold, in a tail bit portion of the data frame, then flowchart 3000 proceeds to step 3024. However, if the state for each of the bits do acceptably match the expected state the expected state, e.g. count meets or exceeds the threshold, then flowchart 3000 proceeds to step 3026. In one embodiment, a threshold can be used to determine what constitutes an acceptable match between expected and actual states for each bit in the tail bit portion of the data frame.

Step 3024 arises if states for the tail bits do not acceptably match the expected states, as determined in step 3022. In step 3024 of the present embodiment, a low level of confidence is established for the potential frame chosen. Step 3024 is implemented, in one embodiment, by the communication device in FIG. 2C. In particular, controller 256 can establish a low level of confidence and store it as data in memory 258, to satisfy step 3024. Following step 3024, flowchart 3000 proceeds to step 3027.

Step 3026 arises if states for the tail bits do acceptably match the expected states, as determined in step 3022. In step 3026 of the present embodiment, a good level of confidence is established for the potential frame chosen, in response to inquiry of step 3022. Step 3026 is implemented, in one embodiment, by the communication device in FIG. 2C. In particular, controller 256 can establish a good level of confidence and store it as data in memory 258, to satisfy step 3026. Following step 3026, flowchart 3000 proceeds to step 3027.

In step 3027 of the present embodiment, an inquiry determines whether the branch metric deltas for the tail bits exceed a threshold. Step 3027 implements the following procedure. A branch metric for "expected 0" input and a branch metric for "expected 1" input is calculated and respectively summed, e.g. Equation 1.1 below, for every state of a given time stage in the tail bit portion, e.g. 280 of FIG. 2D, of the trellis diagram, e.g. 200d. There are 256 states for a given time state with constraint length K=9. A delta, e.g. Equation 1.1 below, is then calculated from the difference between the summed expected 1 branch metric and the summed expected 0 branch metric for each time stage. In the present embodiment, a small branch metric is a good metric result. Next, the deltas for all time stages in the tail bit portion are summed to obtain a deltasum, e.g. Equation 1.2 below. While the present embodiment shows specific number of states and time stages, e.g. tail bits, the present invention is well-suited to using any number of states and time stages. In mathematical form, the equations for the present embodiment are as follows.

$$\text{delta(tail bit)} = \{\Sigma[\text{Expected 1 branch metrics(states)}] - \Sigma[\text{Expected 0 branch metrics(states)}]\}; \quad \text{(Eqn. 1.1)}$$

for states=1 to $2^{K-1}$, where K is the constraint length.

$$\text{deltasum} = \Sigma \text{delta(tail bits); for tail bits=1 to 8, for K=9} \quad \text{(Eqn. 1.2)}$$

If the deltasum is a large positive value, then flowchart 3000 proceeds to step 3028. However, if the deltasum is a smaller number, then flowchart 3000 proceeds to step 3029.

Step 3028 arises if the deltasum is a large positive value. In step 3028, a good level of confidence is established that the frame rate utilized by the Viterbi decoder is the correct one. This is because all the tail bits should be zeros, per the apriori-established zero level of the tail bits. Hence, the summed expected 0 branch metrics should provide a small value while the summed expected 1 branch metrics should provide a large value. Consequently, the deltasum should be a large positive number if the correct frame rate was utilized.

Step 3029 arises if the deltasum is a smaller value. In step 3029, a low level of confidence is established that the frame rate utilized by the Viterbi decoder is the incorrect one. This is because, with the wrong frame rate chosen, an opposite logic level may exist in the tail bit portion of the data frame. Consequently, the summed expected 0 branch metrics will be large while the summed expected 1 branch metrics will be small. Hence, the deltasum can be a smaller number. However, many different combinations of deltasum can exist.

Alternative embodiments for step 3027 through 3029 can utilize a sliding scale subjective evaluation for determining the level of confidence provided by this method. For example, a sliding scale is used in one embodiment to determine a level of confidence depending upon how close the accumulated best metric is the first threshold. Thus, a very good level of confidence may be established if the accumulated best metric is far below the first threshold. And a very low level of confidence may be established if, for example, the accumulated best metric far surpasses the first threshold. Furthermore, while the present embodiment utilizes a specific equation for determining the deltasum, alternative equivalent mathematical equations can also be utilized.

In step 3030 of the present embodiment, an inquiry determines whether alternative potential frame rates exist. In the present embodiment, multiple intermediate frame rates exist, e.g. half-rate data rate B 220b and quarter-rate data rate C 220c. However, the present invention is well-suited to having just two frame rates. In the latter embodiment, if the results for the first chosen potential frame rate result in a consistent low level of confidence, then by process of elimination, the alternative frame rate may be assumed to be the correct one, in lieu of performing the test again. Alternatively, both rates can be checked in another embodiment to determine which has a greater level of confidence based on the distance of the correlation result, for each frame rate, from the respective threshold value, which can be different for different frame rates. In another embodiment, weighting can also be utilized in making a decision as to the confidence level of an evaluated frame rate. In yet another embodiment, flowchart 3000 can be used to evaluate many more frame rates than the rates used in the original embodiment. If no alternative intermediate frame rates exist, then flowchart 3000 proceeds to step 3032. If alternative intermediate frame rates do exist, then flowchart 3000 returns to step 3004, to repeat the appropriate steps for a new alternative frame rate.

In step 3032 of the present embodiment, the level of confidence obtained from the steps in flowchart 3000 is provided to communication device. Step 3032 is implemented, in one embodiment, by the communication device in FIG. 2C. In particular, memory 258 and controller 256 can choose the frame rate, and associated decoded signal, and provide it as output to baseband processor 260, depending upon the composite, or individual, level of confidence obtained. In this manner, the present invention provides a reliable level of confidence of the frame rate of a data frame in essentially a parallel timing as with the decoding operation itself. Thus, the present invention overcomes some of the limitations of the prior art. Following step 3032, flowchart 3000 proceeds to end. In another embodiment, the level of confidence obtained from the present invention can be combined with outer conventional frame rate determination algorithms, using weighting factors in another embodiment, to arrive at a final level of confidence. Weighting factors are used because some tests may provide a more reliable confidence level than other tests.

While flowchart 3000 of the present embodiment shows a specific sequence and quantity of steps, the present invention is suitable to alternative embodiments. For example, not all the steps provided for flowchart 3000 are required for the present invention. In particular, flowchart 3000 utilizes a composite test to establish a level of confidence. That is, flowchart 3000 utilizes a test on several types of metrics to determine whether the frame rate chosen for the Viterbi decoder reflects the actual frame rate of the data frame. In other words, any of the tests, e.g. step 3010, 3016, 3022, or 3027, can be performed independently, without the others. And additional steps may be added to those presented.

Likewise, the sequence of the steps can be modified depending upon the application. Furthermore, while flowchart 3000 is shown as a single serial process, it can also be implemented as a continuous or parallel process. For example, is appreciated that flowchart 3000 can be repeated for the multiple potential frame rates which a communication system may have. Additionally, a composite level of confidence can be established from a composite of the individual level of confidences determined from the different tests conducted in the present embodiment. For example, one test with a very good level of confidence may override another test with a mediocre level of confidence. Furthermore, weighting of the individual confidence levels obtained from the different tests can be used to determine the composite level of confidence that a given frame rate is the frame rate at which a data frame was transmitted.

While the steps in flowchart 3000 utilize a low metric as an indication of a good match in a signal, the present invention is well-suited to using an alternative metric scenario. Additionally, while the present embodiment utilizes different tests in the steps for evaluating a data frame for different frame rates, the present invention is well-suited to alternative test configurations.

Many of the instructions for the steps, and the data input and output from the steps, of flowchart 3000 utilize memory 222 and utilize controller 256. The memory storage for the present embodiment can either be permanent, such as read only memory (ROM), or temporary memory such as random access memory (RAM). Memory 222 can also be any other type of memory storage, capable of containing program instructions, such as a hard drive, a CD ROM, or flash memory. Furthermore, controller 256 can either be a dedicated controller, an existing system processor, or it can be a dedicated digital signal processing (DSP) processor. Alternatively, the instructions may be implemented using some form of a state machine.

Figure 4:
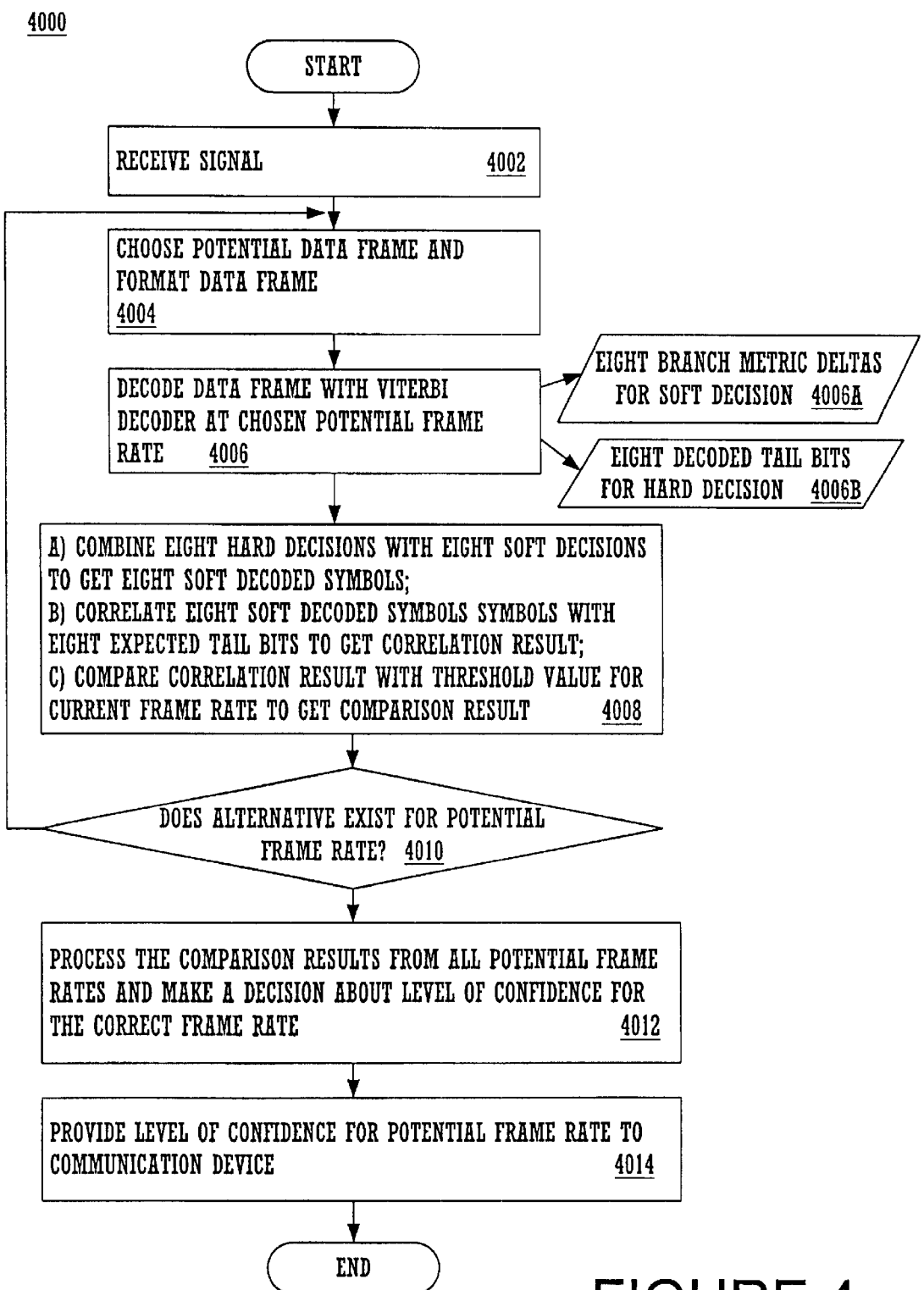
FIG. 4 is a flowchart of the steps used to implement a second embodiment for frame rate determination of a data frame in a communication device, in accordance with one embodiment of the present invention.

Referring now to FIG. 4, a flowchart of the steps used to implement a second embodiment for frame rate determination of a data frame in a communication device is shown, in accordance with one embodiment of the present invention. By using the flowchart embodiment of the present invention, the frame rate of a data frame may be more accurately determined using novel strategies. Consequently, the present invention provides improved capacity, fidelity, and performance of digital communications. While the present embodiment applies flowchart 3000 to a CDMA digital communication system, the present invention can be applied to any communication system seeking to identify a data rate. Also, the present invention is applicable to both mobile units and base stations used for telecommunications operations.

Flowchart 4000 begins with step 4002. In step 4002 of the present embodiment, a signal is received. Step 4002 is implemented, in one embodiment, by the communication device in FIG. 2C. Antennae 252 receives a signal which is processed by transceiver 254 and transmitted to baseband processor 260 for digital signal processing. In one embodiment communication device 200*c* can represent a mobile phone or a base station in a CDMA digital communication system. However, the present invention is well-suited to alternative communication systems. FIG. 5 provides one embodiment that implements step 4002. Following step 4002, flowchart 4000 proceeds to step 4004.

In step 4004 of the present embodiment, a potential frame rate is chosen and formatted. Step 4004 is implemented, in one embodiment, in FIG. 5 where formatting is shown for the different chosen frame rates. Step 4004 arises because the present embodiment utilizes a "variable-rate" communication system. Thus, the rate at which data is communicated between two devices can have any one of many possible rates. The present embodiment utilizes four possible frame rates, e.g. full rate A 220*a*, half-rate B 220*b*, quarter-rate C 220*c*, and eighth-rate D 220*d*, as shown in FIG. 2B. However, the present invention is well-suited to a communication system having any number of communication rates. Step 4006 is implemented, in one embodiment, by the communication device in FIG. 2C. A potential frame rate can be chosen from those stored in memory 258 of communication device 200*c*, and communicated to baseband processor 260 for evaluation of the data frame portion of the signal. FIG. 5 provides several cases of one embodiment that implements step 4002. Following step 4004, flowchart 4000 proceeds to step 4006.

In step 4006 of the present embodiment, a data frame is decoded by the Viterbi decoder at the chosen potential frame rate. Step 4006 is implemented, in one embodiment, by the communication device 200*c* in FIG. 2C. Specifically, Viterbi decoder 262 of communication device 200*c* is adapted to decode a data frame. It is appreciated that the construction and operation of the Viterbi decoder 262 is well known in the art. It is further appreciated that a Viterbi decoder typically provides the following outputs. First, a 'symbol detector' portion of the Viterbi decoder outputs eight branch metric deltas, e.g. 'soft decision outputs,' at the end of the received data frame. These branch metric deltas correspond to the eight tail bit output 4006a of flowchart 4000. In parallel, a 'sequence detector' portion of the Viterbi decoder outputs the decoded bits of the data frame. The present embodiment utilizes the decoded bits corresponding to the eight tail bits, e.g. the 'hard decision outputs,' 4006b of flowchart 4000. These outputs are utilized in subsequent steps of flowchart 4000. Following step 4006, flowchart 4000 proceeds to step 4008.

Step 4008 of the present embodiment comprises the following sub-steps. First, the hard and soft decision outputs obtained from step 4006 are respectively combined together to obtain eight 'soft symbols.' The hard and soft decisions may be combined in a wide variety of ways, adaptable to a given preference. The soft symbol outputs are reliable because they arise from a combination of apriori knowledge, e.g. the branch metric deltas, and the actual decoding process, e.g. the decoded tail bits.

The second sub-step of step 4008 matches the eight soft symbols to apriori-established logic levels of tail bits. The present embodiment accomplishes this portion of step 4008 by determining the correlation of each of the eight soft symbols with each respective expected value of the tail bit. Thus, a 'correlation result' is obtained. The final sub-step compares the correlation result with a threshold value, for the currently chosen frame rate, that was determined from the apriori-established level of the tail bits. Consequently, a 'comparison result' is obtained. In one embodiment, the threshold value is different for different available frame rates. In the present embodiment, the amount by which the correlation result falls below the threshold values, corresponds to an increasing level of confidence that the frame rate utilized for encoding is the frame rate used for transmitting the data. The comparison result obtained from step 4008 can be stored in memory for subsequent referencing. FIG. 5 provides one embodiment that implements step 4008. Following step 4008, flowchart proceeds to step 4010.

In step 4010 of the present embodiment, an inquiry determines whether alternative potential frame rates exist. If no alternative potential frame rates exist, then flowchart 4000 proceeds to step 4012. However, if alternative frame rates do exist, then flowchart 4000 returns to step 4004, to repeat the appropriate steps for the alternative frame frames. These steps are repeated until all potential frame rates are checked and the comparison results, or level of confidence, from each is obtained.

Step 4012 arises if no alternative potential frame rates exist, per inquiry step 4010. In step 4012 of the present embodiment, the comparison results from all potential frame rates are processed to determine the rate that has the greatest level of confidence. In one embodiment, this determination is based on the difference of the correlation result, for each frame rate, from its respective threshold value. In another embodiment, weighting can also be utilized in making a decision as to the confidence level of an evaluated frame rate. In yet another embodiment, flowchart 4000 can be used to evaluate many more frame rates than that used in the original embodiment. After making this rate determination, flowchart 4000 proceeds to step 4014.

In step 4014 of the present embodiment, the determined frame rate and its level of confidence obtained by the prior steps is provided to the communication device. Step 4014 is implemented, in one embodiment, by the communication device in FIG. 2C. A composite level of confidence, with weighting factors in one embodiment, can be stored in memory location 258. A good level of confidence can result in the data frame being processed by, and output from, baseband processor 260 at the applicable frame rate. Following step 4014, flowchart 4000 proceeds to end.

Flowchart 4000 arrives at a level of confidence that a data frame has a specific frame rate. This decision is arrived at, based on hard decision decoded tail bits from the sequence detector portion of the Viterbi decoder as well as soft decision branch metric deltas for tail bits, from the symbol detector portion of the Viterbi decoder. This combination of hard and soft decisions provides unique soft symbol outputs and thereby results in a more reliable analysis and determination of the frame rate. Thus the present embodiment thus provides a reliable additional test that can uniquely provide an indication of the frame rate for a data frame. However, the present invention can also be utilized, in combination with other tests for frame rates.

While flowchart 4000 of the present embodiment shows a specific sequence and quantity of steps, the present invention is suitable to alternative embodiments. For example, not all the steps provided for flowchart 4000 are required for the present invention. And additional steps may be added to those presented. Likewise, the sequence of the steps can be modified depending upon the application. Furthermore, while flowchart 4000 is shown as a single serial process, it can also be implemented as a continuous or parallel process. For example, is appreciated that flowchart 4000 can be repeated for the multiple potential frame rates which a communication system may have.

Many of the instructions for the steps, and the data input and output from the steps, of flowchart 4000 utilize memory 222 and utilize controller 256. The memory storage for the present embodiment can either be permanent, such as read only memory (ROM), or temporary memory such as random access memory (RAM). Memory 222 can also be any other type of memory storage, capable of containing program instructions, such as a hard drive, a CD ROM, or flash memory. Furthermore, controller 256 can either be a dedicated controller, an existing system processor, or it can be a dedicated digital signal processing (DSP) processor. Alternatively, the instructions may be implemented using some form of a state machine.

Referring now to FIG. 5, a chart of several exemplary data frames at different stages of transmission and reception is shown, in accordance with one embodiment of the present invention. The exemplary data frames show the format of the unencoded data and the formatting performed on the receive side for the different potential frame rates. Data frame 500a shows the unencoded data frame input to a rate ½, having constraint length K=9 convolutional encoder. The frame rate has data bits and ends with eight tail bits, B1–B8, as shown. Data frame 500b is a convolutionally encoded frame, with two symbols per unencoded data bit. For example, C81 and C82 are the two encoded symbols corresponding to the tail bit B8, while C71 and C72 are the two encoded symbols corresponding to the tail bit B7. If the encoded frame is transmitted at full rate, then the transmitted symbols correspond exactly to the encoded symbols. Data frame 500c shows a data frame transmitted at full-rate where:

T71=C71
T72=C72
T81=C81
T82=C82

The above frame is transmitted and received as described in step 4002 of flowchart 4000, as one embodiment of the present invention.

Data frames 500*d*–500*e* show one embodiment of several cases of different formatting for a received data frame. Formatting the data frames at different frame rates essentially provides one embodiment of step 4004 of flowchart 4000. The subsequent analysis of the data frames at the different formatted rates provides one embodiment of step 4008 of flowchart 4000.

For example, data frame 500*d* provides a data frame formatted at full transmission rate. Consequently, received symbols correspond exactly the transmitted symbols, e.g.

F71=T71=C71
F72=T72=C72
F81=T81=C81
F82=T82=C82

Data frame 500*d* shows that the full-rate formatted symbols exactly match the symbols out of the encoder. Resultantly, when this formatted frame is fed to the Viterbi decoder, the received symbols will match the expected symbols. Hence, the decoder will decode correctly. Also, the branch metric deltas for the tail bits will therefore result in high values, e.g. good correlation result.

In contrast, data frame 500*e* is formatted at half rate. Each pair of received symbols is combined, e.g. added in the present embodiment, to provide one half rate symbol. Thus, data frame 500*e* is a formatted frame where:

H81=(T71+T72)=(C71+C72)
H82=(T81+T82)=(C81+C82)
H82=(T81+T82)=(C81+C82)

For data frame 500*e*, the half rate formatted received symbols do not match the symbols out of the encoder. Resultantly, when this formatted frame is fed to the Viterbi decoder, the received symbols will not match the expected symbols. Hence, the decoder will be fed incorrect data and will decode incorrectly. In addition, when different received symbols are added the result can cause the branch metric delta to be a low value, e.g. a bad correlation result. For example, when different branch symbols T81 and T82 are added they will yield symbol H82. Because T81 and t82 can have opposite logic levels, the result, H82, can be in the middle. This middle value will cause the branch metric delta to be a low value. In summary, the above mentioned data frames show how flowchart 4000 utilizes the formatting differences, along with the apriori knowledge of the tail bits, to reliably determine the frame rate of a data frame.

In view of the embodiments presented herein, the present invention effectively provides a method and apparatus for improving the capacity, fidelity, and performance of digital communication. More specifically, the present invention provides a method and apparatus for determining the frame rate of a data frame in a variable rate communication system. More specifically, the present invention determines the frame rate using new strategies. Furthermore, the present invention operates accurately in the presence of significant channel noise. Additionally, the method and apparatus of the present invention is easy to implement and is conducive to use with existing variable rate communication systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a variable rate communication system, a method of determining an unknown frame rate for a data frame portion of a signal, said method comprising:

a) receiving said signal at said communication system;
   b) analyzing said data frame portion of said signal;
   c) choosing a potential frame rate;
   d) sampling a portion of said data frame at said potential frame rate to obtain received data;
   e) comparing said received data against apriori knowledge of transmitted data for said portion of said data frame;
   f) indicating a level of confidence to said communication system that said unknown frame rate is equivalent to said potential frame rate based upon a result from step (e);
   g) decoding said data frame at said potential frame rate with a Viterbi decoder;
   h) receiving a branch metric delta from said Viterbi decoder fro each bit in a tail bit portion of said data frame; and
   i) receiving a decoded bit from said Viterbi decoder for each bit location in said tail bit portion of said data frame.

2. The method recited in claim 1 further comprising the step of:

j) combining a total of eight branch metric deltas for said tail bit portion of said data frame to obtain eight soft decoded symbols;
   k) correlating a total of eight decoded bits, for each bit location in said tail bit portion of said data frame, to obtain a correlation result; and
   l) comparing said correlation result with a threshold value for current frame rate to obtain a comparison result.

3. The method recited in claim 2 further comprising the step of:

m) repeating steps b) through l) for each potential frame rate available for said variable rate communication system.

4. The method recited in claim 3 further comprising the step of:

m) processing said comparison result obtained for said each potential frame rate to make a decision about said level of confidence of a correct frame rate.

5. The method recited in claim 4 further comprising the step of:

m) providing said level of confidence of said correct frame rate to said variable rate communication system.

6. A communication device for determining an unknown frame rate of a data frame portion of a signal transmitted over a variable rate communication system, said communication device comprising:

a receiver, said receiver adapted to receive said signal;
   a decoder, said decoder adapted to provide a data frame portion of said signal;
   a processor, said processor coupled to said receiver; and
   a computer readable memory unit, said computer readable memory unit coupled to said processor, said computer readable memory unit containing program instructions stored therein that execute, via said processor, a method of determining said unknown frame rate of said data frame, said method comprising:

a) receiving said signal at said communication system;
b) analyzing said data frame portion of said signal;
c) choosing a potential frame rate;
d) sampling a portion of said data frame at said potential frame rate to obtain received data;
e) comparing said received data against apriori knowledge of transmitted data for said portion of said data frame;
f) indicating a level of confidence to said communication system that said unknown frame rate is equivalent to said potential frame rate based upon a result from step (e);
g) decoding said data frame at said potential frame rate with a Viterbi decoder;
h) receiving a branch metric delta from said Viterbi decoder for each bit in a tail bit portion of said data frame; and
i) receiving a decoded bit from said Viterbi decoder for each bit location in said tail bit portion of said data frame.

7. The communication device recited in claim 6 further comprising the step of:
j) combining a total of eight branch metric deltas for said tail bit portion of said data frame to obtain eight soft decoded symbols;
k) correlating a total of eight decoded bits, for each bit location in said tail bit portion of said data frame, to obtain a correlation result; and
l) comparing said correlation result with a threshold value for current frame rate to obtain a comparison result.

8. The communication device recited in claim 7 further comprising the step of:
m) repeating steps b) through l) for each potential frame rate available for said variable rate communication system.

9. The communication device recited in claim 8 further comprising the step of:
n) processing said comparison result obtained for said each potential frame rate to make a decision about said level of confidence of a correct frame rate.

10. The communication device recited in claim 9 further comprising the step of:
o) providing said level of confidence of said correct frame rate to said variable rate communication system.

11. In a communication system with a variable rate having at least a first and a second communication device, a method of determining an unknown frame rate for a data frame portion of a signal, said method comprising:
a) receiving said signal at a first communication device from a second communication device, said first communication device including a Viterbi decoder;
b) receiving a data frame of said signal at said Viterbi decoder;
c) choosing a potential frame rate for said unknown frame rate;
d) determining a level of confidence that said transmitted frame rate of said data frame is said potential frame rate based upon a performance result from said Viterbi decoder for said data frame; and
e) providing a level of confidence to said first communication device that said unknown frame rate for said data frame is said potential frame rate based on a result obtained from both step (c) and step (d);
wherein said performance result of said Viterbi decoder is at least one metric; wherein said at least one metric includes an accumulated best metric; and wherein said unknown frame rate has a low level of confidence of being said potential frame rate if said accumulated best metric is above a threshold value.

12. The method recited in claim 11 wherein said unknown frame rate has a low level of confidence of being said potential frame rate if said difference is below a threshold value.

13. The method recited in claim 12 wherein said portion of said data frame is a tail bit portion of said data frame.

14. The method recited in claim 13 wherein said tail bit portion of said data frame is a final eight bits of said data frame.

15. The method recited in claim 11 wherein said unknown frame rate has a good level of confidence of being said potential frame rate if said difference is above a threshold value.

16. In a communication system with a variable rate having at least a first and a second communication device, a method of determining an unknown frame rate for a data frame portion of a signal, said method comprising:
a) receiving said signal at a first communication device from a second communication device, said first communication device including a Viterbi decoder;
b) receiving a data frame of said signal at said Viterbi decoder;
c) choosing a potential frame rate for said unknown frame rate;
d) determining a level of confidence that said transmitted frame rate of said data frame is said potential frame rate based upon a performance result from said Viterbi decoder for said data frame; and
e) providing a level of confidence to said first communication device that said unknown frame rate for said data frame is said potential frame rate based on a result obtained from both step (c) and step (d);
wherein said performance result of said Viterbi decoder is at least one metric; wherein said at least one metric includes an accumulated best metric; and wherein said unknown frame rate has a good level of confidence of being said potential frame rate if said accumulated best metric is below a threshold value.

17. In a communication system with a variable rate having at least a first and a second communication device, a method of determining an unknown frame rate for a data frame portion of a signal, said method comprising:
a) receiving said signal at a first communication device from a second communication device, said first communication device including a Viterbi decoder;
b) receiving a data frame of said signal at said Viterbi decoder;
c) choosing a potential frame rate for said unknown frame rate;
d) determining a level of confidence that said transmitted frame rate of said data frame is said potential frame rate based upon a performance result from said Viterbi decoder for said data frame; and
e) providing a level of confidence to said first communication device that said unknown frame rate for said data frame is said potential frame rate based on a result obtained from both step (c) and step (d);
wherein said performance result of said Viterbi decoder is at least one metric; and wherein said at least one metric includes an accumulated second-best metric.

18. The method recited in claim 17 wherein said level of confidence is based upon a difference between said accumulated best metric and said accumulated second best metric.

19. In a communication system with a variable rate having at least a first and a second communication device, a method of determining an unknown frame rate for a data frame portion of a signal, said method comprising:
   a) receiving said signal at a first communication device from a second communication device, said first communication device including a Viterbi decoder;
   b) receiving a data frame of said signal at said Viterbi decoder;
   c) choosing a potential frame rate for said unknown frame rate;
   d) determining a level of confidence that said transmitted frame rate of said data frame is said potential frame rate based upon a performance result from said Viterbi decoder for said data frame; and
   e) providing a level of confidence to said first communication device that said unknown frame rate for said data frame is said potential frame rate based on a result obtained from both step (c) and step (d); wherein said performance result is a state status for a portion of said data frame.

20. The method recited in claim 19 wherein said level of confidence is low for a given frame rate if said state status changes anywhere in said portion of said data frame.

21. The method recited in claim 19 wherein said level of confidence is high for said potential frame rate if an acceptable quantity of actual states, for each bit in a tail bit portion of said data frame, match a respective quantity of expected states, for each bit in said tail bit portion of said data frame, given a best metric state from which to start.

22. In a communication system with a variable rate having at least a first and a second communication device, a method of determining an unknown frame rate for a data frame portion of a signal, said method comprising:
   a) receiving said signal at a first communication device from a second communication device, said first communication device including a Viterbi decoder;
   b) receiving a data frame of said signal at said Viterbi decoder;
   c) choosing a potential frame rate for said unknown frame rate;
   d) determining a level of confidence that said transmitted frame rate of said data frame is said potential frame rate based upon a performance result from said Viterbi decoder for said data frame;
   e) providing a level of confidence to said first communication device that said unknown frame rate for said data frame is said potential frame rate based on a result obtained from both step (c) and step (d); and
   f) repeating steps c) through e) for each of a plurality of potential frame rates.

23. In a communication system with a variable rate having at least a first and a second communication device, a method of determining an unknown frame rate for a data frame portion of a signal, said method comprising:
   a) receiving said signal at a first communication device from a second communication device, said first communication device including a Viterbi decoder;
   b) receiving a data frame of said signal at said Viterbi decoder;
   c) choosing a potential frame rate for said unknown frame rate;
   d) determining a level of confidence that said transmitted frame rate of said data frame is said potential frame rate based upon a performance result from said Viterbi decoder for said data frame; and
   e) providing a level of confidence to said first communication device that said unknown frame rate for said data frame is said potential frame rate based on a result obtained from both step (c) and step (d);
   wherein said performance result of said Viterbi decoder is at least one metric; and wherein said at least one metric includes branch metric data for tail bits.

24. The communication device recited in claim 23 wherein said unknown frame rate has a low level of confidence of being said potential transmitted rate if said branch metric data is above a threshold value.

25. The communication device recited in claim 23 wherein said unknown frame rate has a good level of confidence of being said potential transmitted rate if said branch metric data is below a threshold value.

26. The method recited in claim 23 wherein said branch metric data is determined by the following steps:
   d1) calculate an "expected 0" branch metric for every state of a given time stage;
   d2) sum said expected 0 branch metrics obtained from step d1);
   d3) calculate an "expected 1" branch metric for every state of a given time stage;
   d4) sum said expected 1 branch metrics obtained from step d3);
   d5) calculate a delta, said delta equal to a difference between said sum obtained from step d2) and said sum obtained from step d4);
   d6) repeat step d1) through d5) for every time stage in a tail bit portion of said data frame; and
   d7) sum said deltas obtained from step d6) to obtain a deltasum.

27. The method recited in claim 26 wherein said step e) comprises the step of:
   e1) indicating that a good level of confidence exists that said frame rate utilized by the Viterbi decoder is correct if said deltasum exceeds a threshold; and
   e2) indicating that a low level of confidence exists that said frame rate utilized by the Viterbi decoder is correct if said deltasum does not exceed a threshold.

28. A communication device for determining an unknown frame rate of a data frame portion of a signal transmitted over a variable rate communication system, said communication device comprising:
   a receiver, said receiver adapted to receive said signal;
   a decoder, said decoder adapted to provide a data frame portion of said signal;
   a processor, said processor coupled to said receiver; and
   a computer readable memory unit, said computer readable memory unit coupled to said processor, said computer readable memory unit containing program instructions stored therein that execute, via said processor, a method of determining said unknown frame rate of said data frame, said method comprising:
      a) receiving said signal at a first communication device from a second communication device, said first communication device including a Viterbi decoder;
      b) receiving a data frame of said signal at said Viterbi decoder;
      c) choosing a potential frame rate for said unknown frame rate;
      d) determining a level of confidence that said transmitted frame rate of said data frame is said potential frame rate based upon a performance result from said Viterbi decoder for said data frame; and e) providing a level of confidence to said first communication device that said unknown frame rate for said data frame is said potential frame rate based on a result obtained from both step (c) and step (d);

wherein said performance result of said Viterbi decoder is at least one metric; wherein said at least one metric includes an accumulated best metric; and wherein said unknown frame rate has a low level of confidence of being said potential transmitted rate if said accumulated best metric is above a threshold value.

29. The communication device recited in claim 28 wherein said unknown frame rate has a good level of confidence of being said potential transmitted rate if said accumulated best metric is below a threshold value.

30. The communication device recited in claim 28 wherein said at least one metric includes an accumulated second-best metric.

31. The communication device recited in claim 30 wherein said level of confidence is based upon a difference between said accumulated best metric and said accumulated second best metric.

32. The communication device recited in claim 28 wherein said unknown frame rate has a low level of confidence of being said potential frame rate if said difference is below a threshold value.

33. The communication device recited in claim 32 wherein said portion of said data frame is a tail bit portion of said data frame.

34. The communication device recited in claim 33 wherein said tail bit portion of said data frame is a final eight bits of said data frame.

35. The communication device recited in claim 28 wherein said unknown frame rate has a good level of confidence of being said potential frame rate if said difference is above a threshold value.

36. A communication device for determining an unknown frame rate of a data frame portion of a signal transmitted over a variable rate communication system, said communication device comprising:

a receiver, said receiver adapted to receive said signal;

a decoder, said decoder adapted to provide a data frame portion of said signal;

a processor, said processor coupled to said receiver; and a computer readable memory unit, said computer readable memory unit coupled to said processor, said computer readable memory unit containing program instructions stored therein that execute, via said processor, a method of determining said unknown frame rate of said data frame, said method comprising:

a) receiving said signal at a first communication device from a second communication device, said first communication device including a Viterbi decoder;

b) receiving a data frame of said signal at said Viterbi decoder;

c) choosing a potential frame rate for said unknown frame rate;

d) determining a level of confidence that said transmitted frame rate of said data frame is said potential frame rate based upon a performance result from said Viterbi decoder for said data frame; and e) providing a level of confidence to said first communication device that said unknown frame rate for said data frame is said potential frame rate based on a result obtained from both step (c) and step (d);

wherein said performance result is a state status for a portion of said data frame.

37. The communication device recited in claim 36 wherein said level of confidence is low for a given frame rate if said state status changes anywhere in said portion of said data frame.

38. The communication device recited in claim 36 wherein said level of confidence is high for said potential frame rate if an acceptable quantity of actual states, for each bit in a tail bit portion of said data frame, match a respective quantity of expected states, for each bit in said tail bit portion of said data frame, given a best metric state from which to start.

39. The communication device recited in claim 36 further comprising the step of:

f) repeating steps c) through e) for each of a plurality of potential frame rates.

40. A communication device for determining an unknown frame rate of a data frame portion of a signal transmitted over a variable rate communication system, said communication device comprising:

a receiver, said receiver adapted to receive said signal;

a decoder, said decoder adapted to provide a data frame portion of said signal;

a processor, said processor coupled to said receiver; and
a computer readable memory unit, said computer readable memory unit coupled to said processor, said computer readable memory unit containing program instructions stored therein that execute, via said processor, a method of determining said unknown frame rate of said data frame, said method comprising:

a) receiving said signal at a first communication device from a second communication device, said first communication device including a Viterbi decoder;

b) receiving a data frame of said signal at said Viterbi decoder;

c) choosing a potential frame rate for said unknown frame rate;

d) determining a level of confidence that said transmitted frame rate of said data frame is said potential frame rate based upon a performance result from said Viterbi decoder for said data frame; and e) providing a level of confidence to said first communication device that said unknown frame rate for said data frame is said potential frame rate based on a result obtained from both step (c) and step (d);

wherein said at least one metric includes branch metric data for tail bits.

41. The communication device recited in claim 40 wherein said unknown frame rate has a low level of confidence of being said potential transmitted rate if said branch metric data is above a threshold value.

42. The communication device recited in claim 40 wherein said unknown frame rate has a good level of confidence of being said potential transmitted rate if said branch metric data is below a threshold value.

43. The communication device recited in claim 40 wherein said branch metric data is determined by the following steps:

d1) calculate an "expected 0" branch metric for every state of a given time stage;

d2) sum said expected 0 branch metrics obtained from step d1);

d3) calculate an "expected 1" branch metric for every state of a given time stage;

d4) sum said expected 1 branch metrics obtained from step d3);

d5) calculate a delta, said delta equal to a difference between said sum obtained from step d2) and said sum obtained from step d4);

d6) repeat step d1) through d5) for every time stage in a tail bit portion of said data frame; and d7) sum said deltas obtained from step d6) to obtain a deltasum.

44. The communication device recited in claim 43 wherein said step e) comprises the step of:

e1) indicating that a good level of confidence exists that said frame rate utilized by the Viterbi decoder is correct if said deltasum exceeds a threshold; and e2) indicating that a low level of confidence exists that said frame rate utilized by the Viterbi decoder is correct if said deltasum does not exceed a threshold.

* * * * *